No. 684,583. Patented Oct. 15, 1901.
J. H. McILWINEN & J. C. FLETCHER.
COMBINED PLOW AND CULTIVATOR FOR PLANTERS AND FERTILIZER DISTRIBUTERS.
(Application filed May 31, 1901.)
(No Model.) 2 Sheets—Sheet 1.
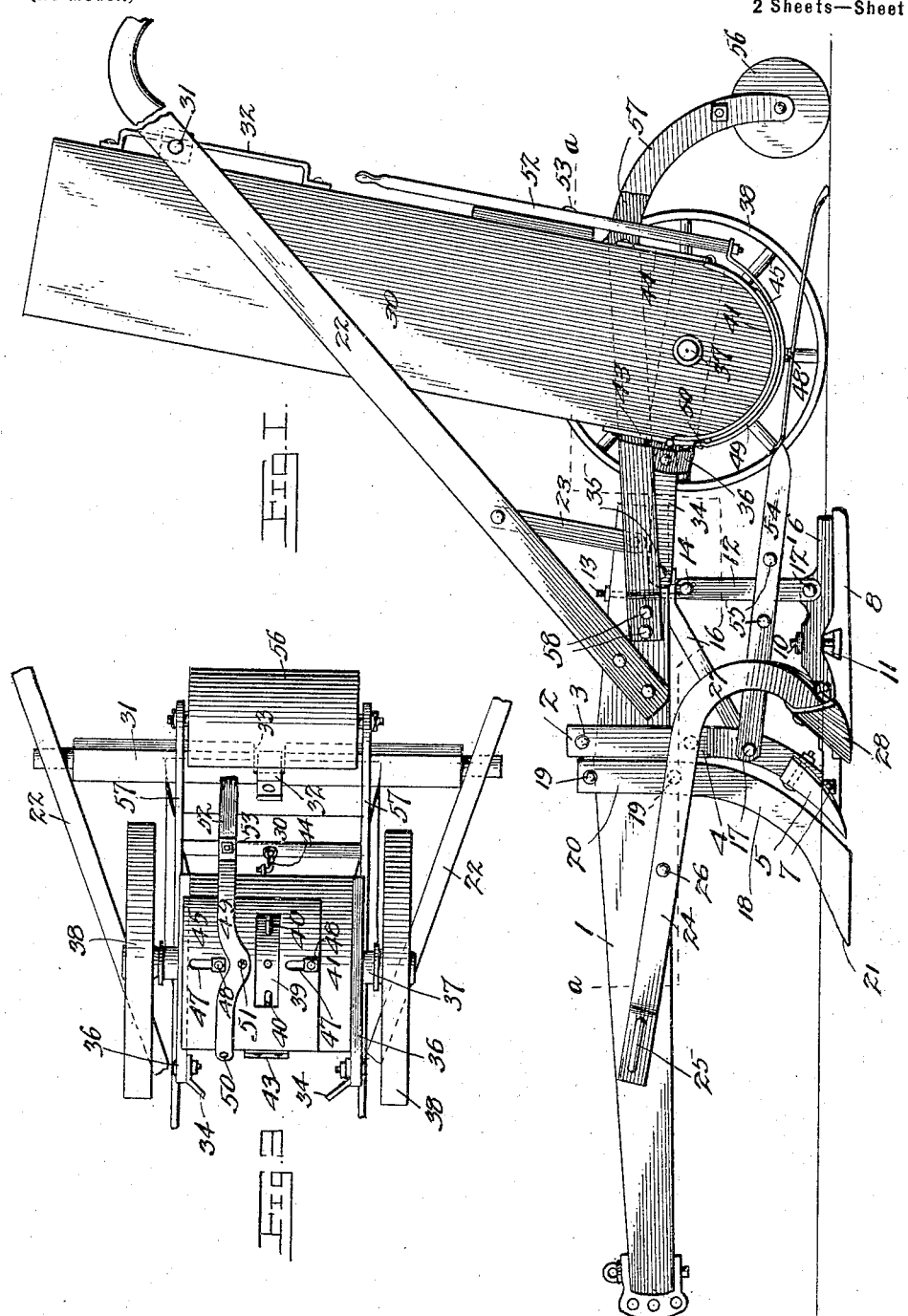
Witnesses
F. E. Alden
J. W. Garner
J. H. McIlwinen and
J. C. Fletcher, Inventors
by C. A. Snow & Co.
Attorneys

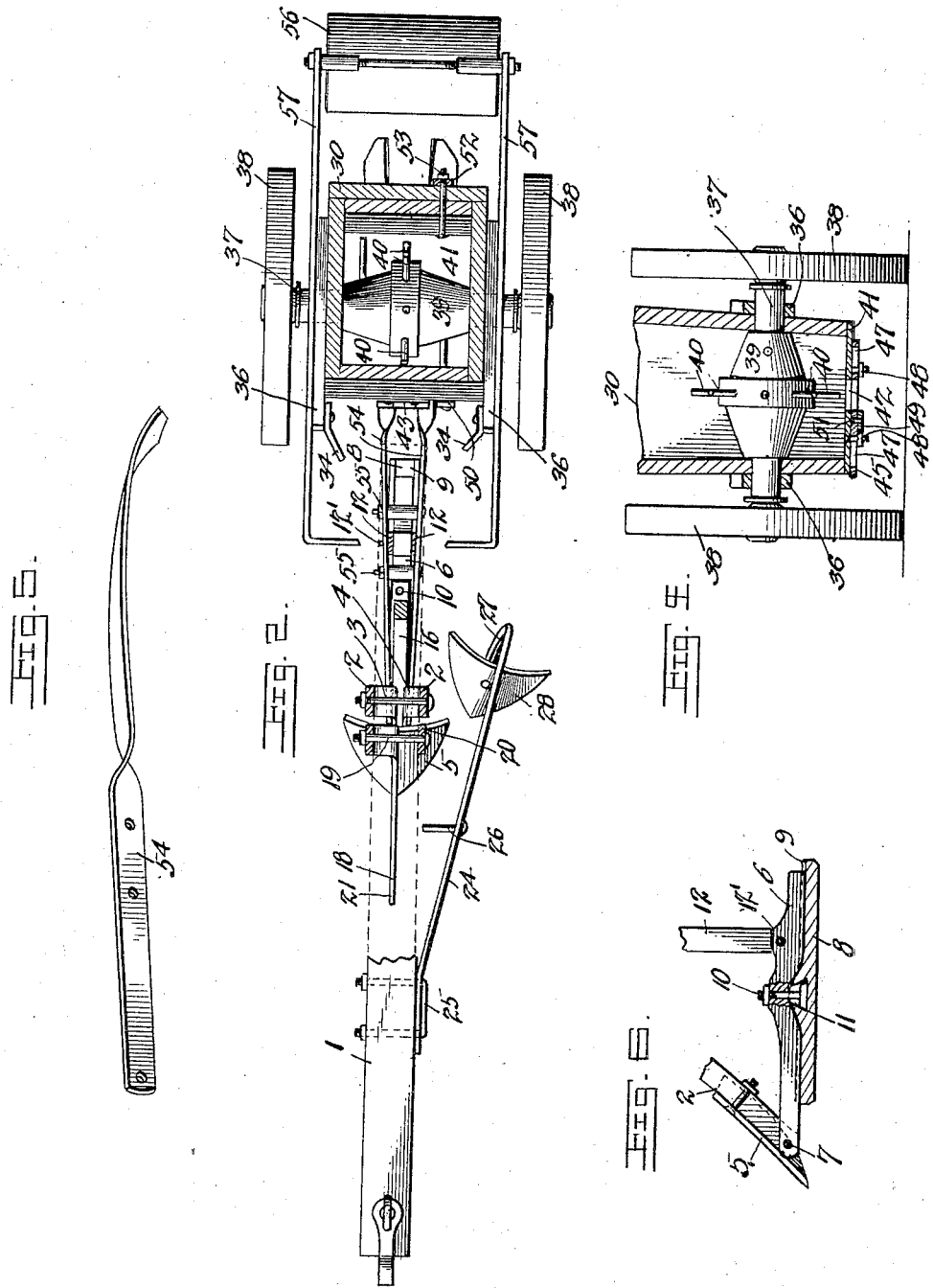

UNITED STATES PATENT OFFICE.

JOHN H. McILWINEN, OF GIBSON, NORTH CAROLINA, AND JOHN C. FLETCHER, OF McCOLL, SOUTH CAROLINA.

COMBINED PLOW AND CULTIVATOR FOR PLANTERS AND FERTILIZER-DISTRIBUTERS.

SPECIFICATION forming part of Letters Patent No. 684,583, dated October 15, 1901.

Application filed May 31, 1901. Serial No. 62,632. (No model.)

*To all whom it may concern:*

Be it known that we, JOHN H. McILWINEN, residing at Gibson, in the county of Scotland and State of North Carolina, and JOHN C. FLETCHER, residing at McColl, in the county of Marlboro and State of South Carolina, citizens of the United States, have invented a new and useful Combined Plow and Cultivator for Planters and Fertilizer-Distributers, of which the following is a specification.

Our invention is an improved combined plow, cultivator, planter, and fertilizer-distributer; and it consists in the peculiar construction and combination of devices hereinafter fully set forth and claimed.

In the accompanying drawings, Figure 1 is a side elevation of our improved combined plow, cultivator, planter, and fertilizer-distributer. Fig. 2 is partly a top plan view of the same and partly a sectional view, taken on a plane indicated by the line *a a* in Fig. 1. Fig. 3 is an inverted plan view of the planting and fertilizer-distributing mechanism. Fig. 4 is a detail transverse sectional view of the same. Fig. 5 is a detail perspective view of one of the coverers. Fig. 6 is a detail elevation, partly in section, of the plow.

To the plow-beam 1 is attached a vertically-adjustable forked standard 2, the arms of which bear on opposite sides of the beam and are connected together by bolts 3, whereby the arms at the upper end of said standard may be clamped to the said beam and the standard adjusted vertically on the beam, as will be understood. The said standard 2 is formed of two pieces of metal of the form shown and bent outwardly, as at 4, to adapt them to retain the beam between them, as shown. A furrow-opening or other suitable plow or shovel 5 is attached to the lower portion of standard 2. The rearwardly-extending bar 6 has its front end disposed between the sides of the standard 2, at the lower end of the latter, and pivotally connected thereto by a bolt 7. On the under side of the said bar 6 is a sole-bar or shoe 8, which is adapted to run in the bottom of the furrow made by the plow or shovel 5. The said shoe 8 is provided on its upper side with a longitudinal groove 9 to receive the lower side of the bar 6, and the said shoe 8 is secured to the said bar by a bolt 10, the head of which is in a dovetailed transversely-disposed groove 11 in the upper side of the shoe 8. Links 12 have their lower ends pivotally connected to the bar 6 by a bolt 12' and have their upper ends connected to a bolt 13 by a bolt 14, which passes through a slot 15 in the lower portion of said bolt 13. Thereby the said links are adapted to be adjusted vertically on the said bolt 13 to dispose the bar 6 and the shoe 8 at any desired angle and to compensate for the vertical adjustment of the standard 2. A brace-bar 16 has its front end attached to the standard 2 by a bolt 17 and its rear end attached to the beam 1 by the bolt 13.

Immediately in advance of the standard 2 is a standard 18, the upper portion of which is vertically adjustable on the beam 1. The said standard 18 is attached to the said beam by bolts 19 and a plate 20. The lower front edge of the said standard 18, which standard is curved forwardly and fashioned as shown, is provided with a cutting edge 21, and said standard forms a colter, which operates in advance of the plow 5. The beam is provided with handles 22, of the usual construction, which are braced by the bars 23.

A cultivator-beam 24 is detachably secured on one side of the beam 1 by a clip-bolt 25 and adjusting-bolt 26, the latter enabling the said cultivator-beam to be adjusted toward and from said beam 1. Said cultivator-beam has a standard 27 formed integrally therewith, to which standard 27 may be attached a suitable cultivating shovel or tongue 28. It will be understood that the said cultivating shovel or tongue operates on one side of the plow.

Our improved plow is adapted to be used for plowing and cultivating purposes and in opening furrows for planting.

In combination with our improved plow we use a detachable seeding and fertilizer-distributing mechanism and suitable coverers, which we will now describe.

A hopper 30, which is preferably of the form shown, is adapted to be placed in rear of the plow-beam and between the handles 22 and to bear against the front side of the cross-bar 31, which connects the handles together. On the rear side of the said hopper, near the upper end thereof, is a traveler-strap 32, which engages a groove 33, with which said cross-bar 31 is provided. The lower portion of the said hopper is connected to the plow-beam 1 by links 34, the front ends of which are pivotally connected to the beam by a bolt 35, and the rear ends of which are pivotally connected to the front end of bars 36 on the sides of the hopper. Hence the lower end of the said hopper is flexibly connected to the plow-beam, and thereby the said hopper is capable of vertical movement independently of the plow-beam. A shaft 37 has its bearings in openings in the sides of the hopper, near the lower end of the latter, and in the bars 36. On the ends of the said shaft are ground-wheels 38, which support the hopper and serve to rotate said shaft, and at the central portion of the latter, between the sides of the hopper, is a roller 39, which is provided with radial peripheral studs 40. The bottom of the hopper is formed by a curved metallic plate 41, which is concentric with the shaft 37, as shown in Fig. 1, and is provided with a longitudinal slot or opening 42, through which seeds or fertilizer may, by the rotation of the roller and spurs 40, be discharged from the hopper, as will be understood. The front side of the curved bottom plate of the hopper is hinged, as at 43, and the rear end thereof is attached to the rear side of the hopper by a hook 44. On the lower side of the curved bottom plate of the hopper is a laterally-movable cut-off plate 45, which is provided with an opening 46, that is adapted to register with the opening 42. By shifting said cut-off plate laterally said opening 42 may be narrowed or widened or entirely cut off. The said cut-off plate 45 is provided with transverse slots 47, in which operate bolts 48, that secure said cut-off plate under the curved bottom plate of the hopper. A shifting link 49, which is curved, as shown in Fig. 1, has its front end pivotally connected to the under portion of the hopper, as at 50. Said shifting link is pivotally attached to the cut-off plate, as at 51, and to the rear end of said shifting link, which projects rearwardly from the hopper, is connected the lower end of a shifting lever 52, the said shifting lever being fulcrumed on the rear side of the hopper, as at 53. A pair of coverer-bars have their front ends pivotally connected to the standard 2 by the bolt 17. The said coverer-bars 54 are disposed on opposite sides of the links 12 and are connected together by bolts 55. Thereby the said coverer-bars are adapted to play vertically on said links. The said coverer-bars, as will be understood, trail and operate in rear of the furrow-opener and serve to cover the furrow. A roller 56 has its bearings in the rear ends of a pair of bars 57. The front ends of the said bars are pivotally connected to the beam 1 by bolts 58. The said bars 57 pass on opposite sides of the hopper 30, and the roller 56 serves to operate on the covered furrow and to press the earth firmly on the planted seeds. A suitable covering-board or covering-shovel may be substituted for the said roller, if preferred.

Our improved planting mechanism is particularly adapted for planting cotton-seed and for distributing fertilizer, but may be used also for planting other varieties of seeds.

From the foregoing it will be understood that our improved combined plow, cultivator, planter, and fertilizer-distributer is adapted for use for a variety of purposes and that the same is a combined implement, which is of great utility to farmers, is extremely simple, is efficient in operation, and may be manufactured at low cost.

Having thus described our invention, we claim—

1. The combination of a beam, a standard, a rearwardly-extending bar having its front end pivotally connected to said standard, links connecting the said bar to said beam, and coverer-bars secured to said standard and to said links, substantially as described.

2. The combination of a beam, a standard, a bar having its front end pivotally connected to the standard, said bar having a shoe on its lower side and vertically-adjustable links connecting the rear portion of said bar to said beam, and coverer-bars secured to said standard and said links, substantially as described.

3. The combination of a beam, a standard, a rearwardly-extending bar having its front end pivotally connected to said standard, connections between the rear portion of said bar and said beam, a shoe having a longitudinal groove on its upper side, in which groove the lower side of said bar is disposed, said shoe having a transverse dovetailed groove in its upper side, and a bolt having a dovetailed head fitted in said groove, and securing said shoe to said bar, substantially as described.

4. The combination of a beam, a vertically-adjustable standard, a rearwardly-extending bar having its front end pivotally connected to the foot of said standard, and a link connected at its lower end to said bar, said link being adjustably connected at its upper end to said beam, substantially as described.

In testimony that we claim the foregoing as our own we have hereto affixed our signatures in the presence of two witnesses.

JOHN H. McILWINEN.
JOHN C. FLETCHER.

Witnesses:
J. W. MASON,
E. R. FLETCHER.